(12) United States Patent
Moyer et al.

(10) Patent No.: US 9,123,377 B1
(45) Date of Patent: Sep. 1, 2015

(54) APPARATUS AND METHOD FOR ALLOWING PASSAGE OF A LEADER THROUGH A TAPE DRIVE TAPE PATH

(71) Applicant: Oracle International Corporation, Redwood City, CA (US)

(72) Inventors: Mark W. Moyer, Broomfield, CO (US); Vikas Agrawal, Santa Clara, CA (US); Steven G. Suttle, Broomfield, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 14/505,611

(22) Filed: Oct. 3, 2014

(51) Int. Cl.
*G11B 15/67* (2006.01)

(52) U.S. Cl.
CPC ........................ *G11B 15/67* (2013.01)

(58) Field of Classification Search
CPC .... G11B 15/67; G11B 15/6656; G11B 15/61; G11B 15/672
USPC .......................................................... 360/95
See application file for complete search history.

(56) References Cited

U.S. PATENT DOCUMENTS

| | | | |
|---|---|---|---|
| 5,227,935 A | | 7/1993 | Gordon et al. |
| 6,690,639 B2 | | 2/2004 | Brewen |
| 6,918,554 B2 * | | 7/2005 | Stamm et al. ............ 242/338 |
| 8,014,239 B2 | | 9/2011 | Coles et al. |
| 8,036,088 B1 * | | 10/2011 | Mahnad ........................ 369/97 |
| 8,630,065 B1 * | | 1/2014 | Underkofler et al. ......... 360/128 |
| 2002/0181145 A1 * | | 12/2002 | Tsuchiya ........................ 360/95 |
| 2003/0112556 A1 * | | 6/2003 | Willems, Jr. ............. 360/130.21 |
| 2007/0064340 A1 * | | 3/2007 | Holmberg et al. ............. 360/95 |
| 2008/0135663 A1 | | 6/2008 | Fletcher et al. |
| 2013/0342930 A1 | | 12/2013 | Mahnad et al. |

OTHER PUBLICATIONS

Oracle Storagetek—"Storagetek T10000D Tape Drive", Oracle Data Sheet, Copyright 2013, Oracle and/or its affiliates, 6 Pages.

* cited by examiner

*Primary Examiner* — Mark Blouin
(74) *Attorney, Agent, or Firm* — Brooks Kushman P.C.

(57) ABSTRACT

A tape drive for use with a tape may comprise a head for performing read and/or write operations on the tape, a drive leader that is cooperable with the tape for moving the tape through the tape drive, and a retraction mechanism for retracting the tape, the drive leader and/or a cartridge leader attached to the tape away from the head to allow at least a portion of the drive leader to pass by the head without contacting the head. The retraction mechanism may include a movable pin that is engageable with the tape, the cartridge leader and/or the drive leader, the pin being movable from a first position proximate the head to a second position disposed further away from the head than the first position.

20 Claims, 2 Drawing Sheets

APPARATUS AND METHOD FOR ALLOWING PASSAGE OF A LEADER THROUGH A TAPE DRIVE TAPE PATH

TECHNICAL FIELD

The following disclosure relates to an apparatus and method for facilitating movement of a tape leader through a tape path of a tape drive.

BACKGROUND

U.S. Pat. No. 8,036,088, which is assigned to the assignee of the present application, discloses an optical tape drive system including a rotatable tape planarizer support structure that supports an optical tape planarizer. The support structure is rotatable between an operational position and a non-operational position. In the operational position, the support structure is configured to position the optical tape planarizer to permit reading/writing of information from/to an optical tape via an optical pickup unit. In the non-operational position, the support structure is configured to position the optical tape planarizer to permit passage of a tape leader through the tape drive system without damage to the optical pickup unit.

SUMMARY

A tape drive, according to the present disclosure, is provided for use with a tape. The tape drive may comprise a head for performing read and/or write operations on the tape, a drive leader that is cooperable with the tape for moving the tape along a tape path of the tape drive, and a refraction mechanism for retracting the tape, the drive leader and/or a cartridge leader attached to the tape away from the head to allow at least a portion of the drive leader to pass by the head without contacting the head. The refraction mechanism may include a movable pin that is engageable with the tape, the cartridge leader and/or the drive leader, the pin being movable from a first position proximate the head to a second position disposed further away from the head than the first position.

In another embodiment according to the present disclosure, a tape drive for use with a tape includes first and second heads for performing read and/or write operations on the tape, and a drive leader that is cooperable with the tape for moving the tape along a tape path of the drive. The tape drive further includes first and second tape stabilizers for facilitating movement of the tape by the first and second heads, respectively, and a retraction mechanism for simultaneously moving the first and second tape stabilizers in different directions and away from the first and second heads, respectively, to allow at least a portion of the drive leader to pass between the tape stabilizers and the heads without contacting the heads.

A method for allowing passage of a connection location of a tape leader through a tape path is also provided. The method includes simultaneously moving first and second tape stabilizers in different directions and away from first and second heads, respectively, to create sufficient gaps between the stabilizers and the heads such that the connection location of the tape leader may move past the heads without contacting the heads.

While exemplary embodiments are illustrated and disclosed, such disclosure should not be construed to limit the claims. It is anticipated that various modifications and alternative designs may be made without departing from the scope of the invention.

DETAILED DESCRIPTION

The present disclosure describes various configurations of data storage and retrieval systems and methods for operating such systems. Several specific embodiments are set forth in the following description and in FIGS. 1-5 to provide a thorough understanding of certain embodiments according to the present disclosure. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Furthermore, as those of ordinary skill in the art will understand, one or more features of an embodiment illustrated and described with reference to any one of the figures may be combined with one or more features illustrated in one or more other figures to produce embodiments that are not explicitly illustrated or described. In addition, other embodiments may be practiced without one or more of the specific features explained in the following description.

Figure 1:
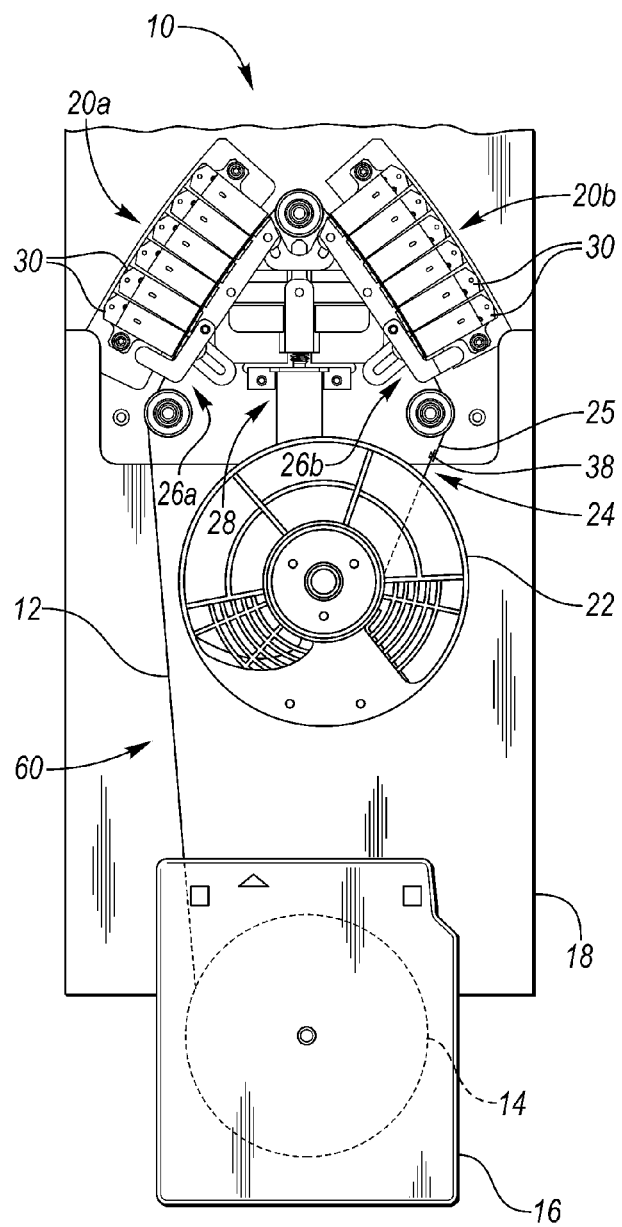
FIG. 1 is a plan view of a data storage and retrieval system for use with a tape and including multiple head assemblies, multiple tape stabilizer arrangements and a retraction mechanism for moving the stabilizer arrangements with respect to the head assemblies.

FIG. 1 shows a data storage and retrieval device in the form of a tape drive 10, according to the present disclosure, for use with a tape 12, such as a magnetic tape or optical tape. While the tape 12 may be provided in any suitable manner, in the illustrated embodiment, the tape 12 is provided by a cartridge reel 14 of a tape cartridge 16 that is insertable into and removable from the tape drive 10.

The tape drive 10 shown in FIG. 1 includes a drive chassis or body 18 configured to receive the tape cartridge 16, and multiple head assemblies 20 (e.g., first and second head assemblies 20a and 20b, respectively) for performing read and/or write operations on the tape 12. The tape drive 10 further includes a rotatable take-up reel 22 supported by the drive body 18 for receiving the tape 12, and a tape leader or drive leader 24 that is attachable with the tape 12, or with a cartridge leader 25 attached to the tape 12, and configured to move the tape 12 toward the take-up reel 22. In addition, the tape drive 10 includes multiple stabilizer assemblies or arrangements 26 (e.g., first and second stabilizer arrangements 26a and 26b, respectively) for facilitating movement of the tape 12 past the head assemblies 20a and 20b, and a retraction mechanism 28 that is cooperable with the drive leader 24 and/or the stabilizer arrangements 26 for facilitating movement of the drive leader 24 past the head assemblies 20a and 20b, as explained below in detail.

Figure 2:
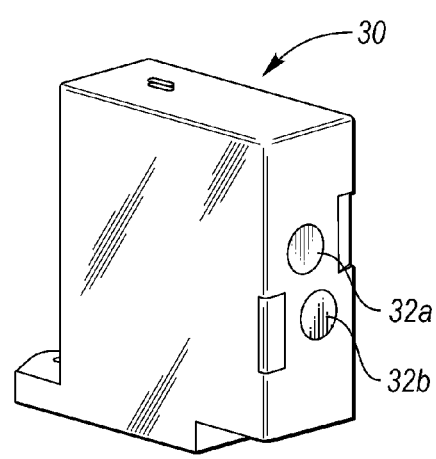
FIG. 2 is a perspective view of a head of one of the head assemblies shown in FIG. 1.

Each head assembly 20a, 20b may be fixed with respect to the drive body 18 and includes one or more heads 30 that may each be configured to read data (e.g., information) from the tape 12 and/or write data to the tape 12. In the illustrated embodiment, each head assembly 20a, 20b includes multiple heads 30 (e.g., 6 heads 30), and each head 30 is formed as an optical pickup unit (OPU) having one or more head elements that are configured to perform read and/or write operations using optical beams or laser light. Referring to FIG. 2, for example, each head 30 may include first and second head elements 32a and 32b, respectively, such as top and bottom head elements, that each include a primary lens or objective lens that receives laser light from a laser element, such as a laser diode. Each head element 32a, 32b may be configured to direct the laser light onto the tape 12 such that the corresponding head 30 may transcribe data tracks of recorded spots on the tape 12, and/or retrieve data from such data tracks, as the tape 12 moves past the head assembly 20a, 20b.

Figure 3:
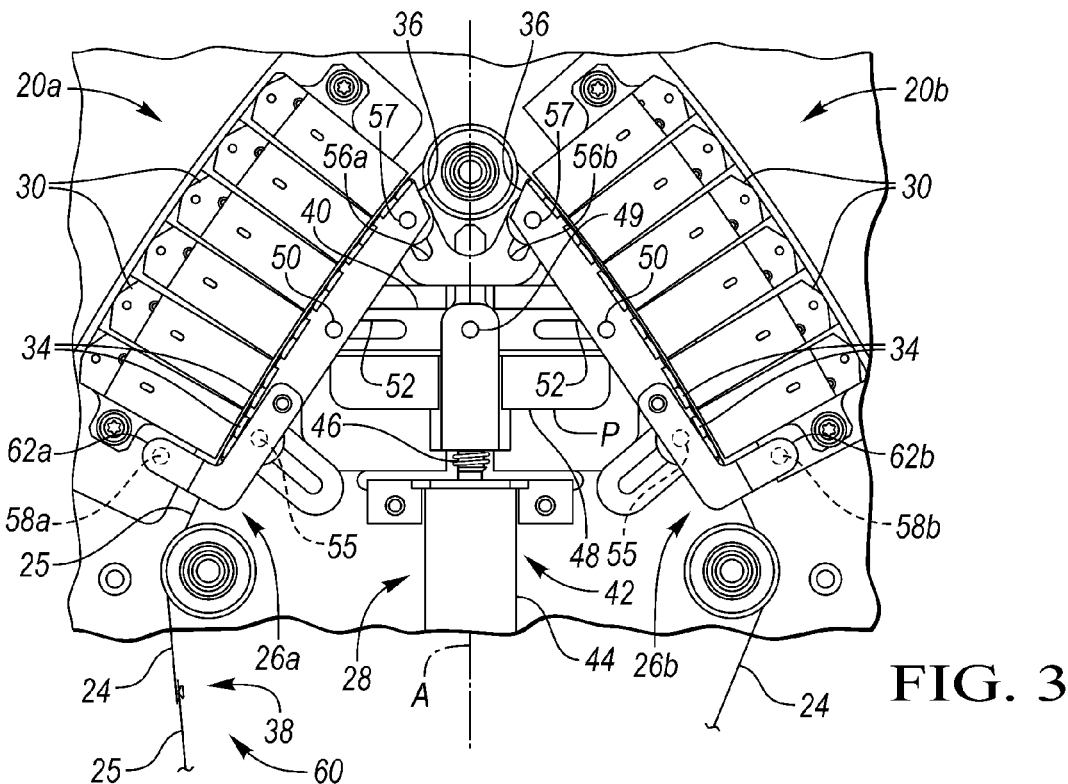
FIG. 3 is an enlarged plan view of the head assemblies and stabilizer arrangements of FIG. 1, showing the stabilizer arrangements in operational positions.

Referring to FIGS. 1 and 3, each stabilizer arrangement 26a, 26b includes one or more tape stabilizers 34 that are mounted on a movable support, such as a stabilizer mount 36, and the tape stabilizers 34 are configured to facilitate movement of the tape 12 past the heads 30. In the embodiment shown in FIG. 3, for example, each stabilizer arrangement 26a, 26b includes two tape stabilizers 34 for each head 30, and the tape stabilizers 34 are configured to stabilize movement of the tape 12 by supporting the tape 12. Furthermore, the tape stabilizers 34 are configured to position the tape 12 sufficiently close to the heads 30 to enable sufficient reading and/or recording operations by the heads 30. For example, each tape stabilizer 34 may position the tape 12 about 0.300 millimeters (mm) to 0.320 mm (e.g., 0.310 mm) away from a corresponding head 30. Such spacing, however, may not be sufficient to allow the drive leader 24 and/or cartridge leader 25 to pass between the tape stabilizers 34 of a particular stabilizer arrangement 26a, 26b and a particular head assembly 20a, 20b.

Advantageously, the retraction mechanism 28 may be configured to move the first and second stabilizer arrangements 26a and 26b away from the first and second head assemblies 20a and 20b, respectively, to allow at least a portion of the drive leader 24 and/or the cartridge leader 25 to pass between the tape stabilizers 34 and the heads 30 without contacting the heads 30. For example, the retraction mechanism 28 may be configured to simultaneously move the first and second stabilizer arrangements 26a and 26b in different directions and away from the first and second head assemblies 20a and 20b, respectively, such that the stabilizer arrangements 26a and 26b may be simultaneously moved from operational positions, shown in FIGS. 1 and 3, to retracted positions, shown in FIG. 4. When the stabilizer arrangements 26a and 26b are in the retracted positions, sufficient space exists between each stabilizer arrangement 26a, 26b and corresponding head assembly 20a, 20b such that a connection location 38 between the drive leader 24 and cartridge leader 25 or tape 12 may pass between the tape stabilizers 34 and the heads 30 without contacting the heads 30. The connection location 38 may be formed, for example, by a connection button on the drive leader 24 that fits into a slot on the cartridge leader 25.

Figure 4:
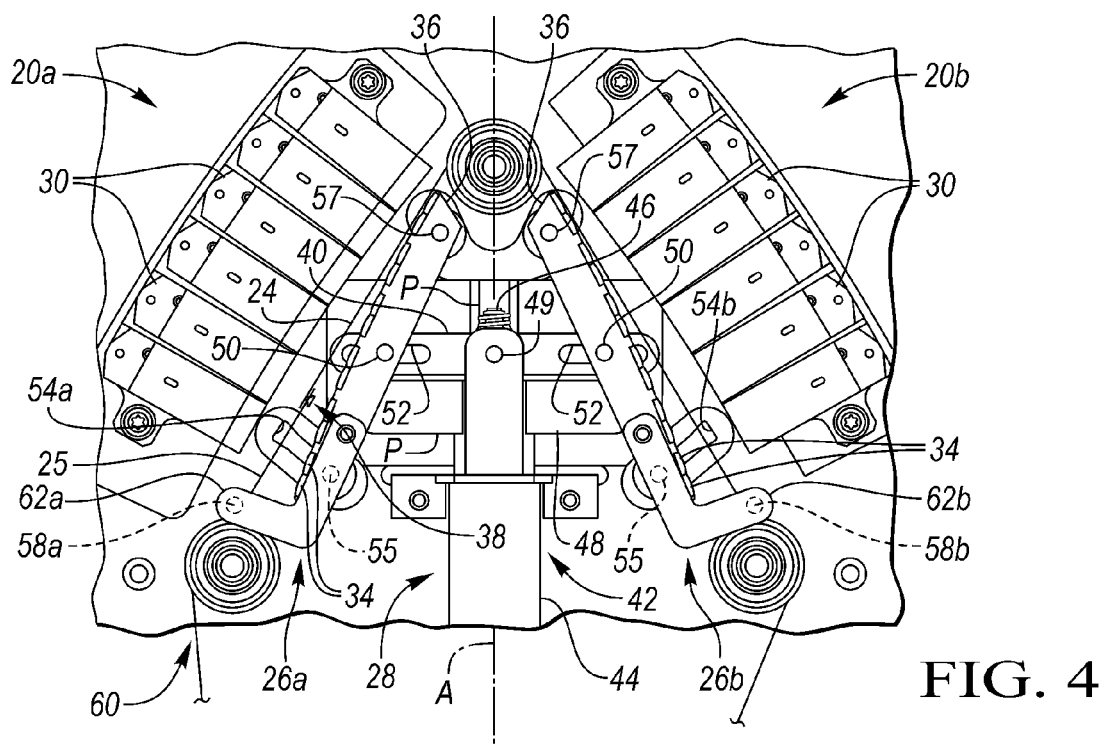
FIG. 4 is an enlarged plan view of the head assemblies and stabilizer arrangements of FIG. 1, showing the stabilizer arrangements in retracted positions.

While the retraction mechanism 28 may have any suitable configuration, in the embodiment shown in FIGS. 3 and 4, the retraction mechanism 28 includes a link 40 (e.g., a tiebar) associated with the first and second tape stabilizer assemblies or arrangements 26a and 26b, and a motor assembly 42 for moving the link 40 so as to move the stabilizer arrangements 26a and 26b (e.g., tape stabilizers 34). The motor assembly 42 may include, for example, a motor 44 connected to a rotatable lead screw 46, and the lead screw 46 may be received in a threaded drive member 48 on which the link 40 is pivotally mounted (e.g., at pivot 49). With such an arrangement, the motor 44 may operate to rotate the lead screw 46 to thereby translate or otherwise move the drive member 48 and the link 40, and the link 40 may cause both stabilizer arrangements 26a and 26b to move between the operational positions, shown in FIG. 3, and the retracted positions, shown in FIG. 4.

As further shown in FIGS. 3 and 4, the link 40 and/or drive member 48 may include one or more projections P that slidably engage the drive body 18 in order to inhibit or prevent rotational movement of the link member 40 and drive member 48 about an axis A of the lead screw 46 and/or motor 44. In addition, the stabilizer mounts 36 may be slidably mounted on the link 40 with pins 50 that are slidably received in slots 52 formed in the link 40 such that the stabilizer mounts 36 are able to move with respect to the link 40.

The tape drive 10 may also include one or more guide features that are cooperable with the stabilizer mounts 36, or other portions of the stabilizer arrangements 26a and 26b, for guiding movement of the stabilizer mounts 36 between the retracted and operational positions. In the embodiment shown in FIGS. 3 and 4, for example, the drive body 18 of the tape drive 10 includes first and second guide slots 54a and 54b, respectively, that are engageable with guide members 55 (e.g., guide pins and bushings) formed at or near first ends of the stabilizer mounts 36, and third and fourth guide slots 56a and 56b, respectively, that are engageable with guide members 57 (e.g., guide pins) formed at or near second ends of the stabilizer mounts 36. While the guide slots may have any suitable configuration, in the embodiment shown in FIGS. 3 and 4, each of the first and second guide slots 54a, 54b is formed as an elongated slot that extends at an angle in the range of 25 to 80° with respect to the axis A, and each of the third and fourth guide slots 56a, 56b is formed as an elongated slot that extends at an angle in the range of 15 to 50° with respect to the axis A. Furthermore, the third and fourth guide slots 56a and 56b are spaced away from the first and second guide slots 54a and 54b, respectively, and each of the third and fourth guide slots 56a, 56b is shorter than each of the first and second guide slots 54a, 54b. For example, each of the third and fourth guide slots 56a, 56b may have a length in the range of 4 to 6 millimeters (mm), and each of the first and second guide slots 54a and 54b may have a length in the range of 11 to 13 mm.

Figure 5:
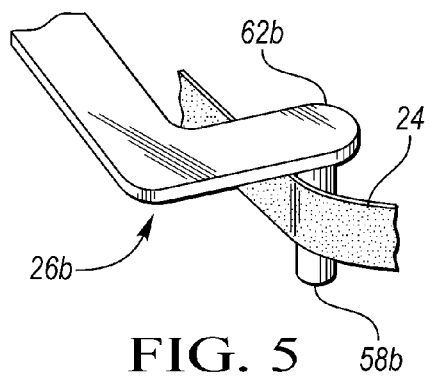
FIG. 5 is a fragmentary perspective view of an engagement member of the refraction mechanism.

The retraction mechanism 28 may further comprise first and second engagement members 58a and 58b, respectively, that are engageable with the tape 12, drive leader 24 and/or cartridge leader 25 for moving the tape 12, drive leader 24 and/or cartridge leader 25 away from the heads 30 when the first and second stabilizer arrangements 26a and 26b are moved away from the first and second head assemblies 20a and 20b, respectively, to allow at least a portion of the drive leader 24 (e.g., connection location 38) to pass by the heads 30 without contacting the heads 30. Referring to FIGS. 4 and 5, the first and second engagement members 58a and 58b may be formed as pins that are each supported by and movable with one of the stabilizer mounts 36, such that each pin is movable from a first position proximate a particular head 30 to a second position disposed further away from the head 30 than the first position. The stabilizer mounts 36 or the entire stabilizer arrangements 26a and 26b may therefore be considered part of the retraction mechanism 28.

Referring to FIGS. 1-5, example operation of the tape drive 10 will now be described in further detail. First, the tape cartridge 16 may be inserted into the tape drive 10, and the drive leader 24 may be connected to the cartridge leader 25 at connection location 38 in any suitable manner (e.g., a connection button on one of the leaders 24, 25 may be inserted into a slot or other opening on the other leader 24, 25). Next, the drive leader 24 may be used to pull the cartridge leader 25 and tape 12 along a tape path 60 of the tape drive 10. For example, the drive leader 24 may be connected to the take-up reel 22 such that rotation of the take-up reel 22 may cause the drive leader 24 to pull or otherwise move the cartridge leader 25 and tape 12 along various guide members, such as rollers, and toward the take-up reel 22.

Before the connection location 38 between the drive leader 24 and the cartridge leader 25 is moved by the head assemblies 20a and 20b, however, the retraction mechanism 28 may be operated to move the stabilizer arrangements 26a and 26b to their retracted positions shown in FIG. 4. For example, the motor 44 may be used to rotate the lead screw 46 in a first direction to cause the drive member 48 and link 40 to translate or otherwise move toward the motor 42. As a result, the link 40 will cause the stabilizer arrangements 26a and 26b to pivot or otherwise move with respect to the drive body 18 from the operational positions, shown in FIGS. 1 and 3, to the retracted positions, shown in FIG. 4, such that the tape stabilizers 34 are moved away from the tape path 60. Furthermore, the interaction between the stabilizer arrangements 26a, 26b and guide slots 54a, 54b, 56a and 56b facilitates movement of the stabilizer arrangements 26a, 26b.

With the above configuration, the motor 44 may be used to simultaneously move both stabilizer arrangements 26a and 26b in different directions and away from the first and second head assemblies 20a and 20b, respectively, to create sufficient gaps between the stabilizers 34 and the heads 30 such that the connection location 38 of the drive leader 24 may move past the heads 30 without contacting the heads 30. By using a single motor and associated drive mechanism, size and cost of the tape drive 10 may be minimized. In addition, by using the slotted and pivotally mounted link 40 in conjunction with the guide slots 54a, 54b, 56a and 56b, the drive 10 provides sufficient degrees of freedom to account for tolerance variations of the associated components.

When the stabilizer arrangements 26a and 26b are moved toward their retracted positions, the first and second engagement members 58a and 58b may also engage the drive leader 24, cartridge leader 25 and/or tape 12 so that the drive leader 24, cartridge leader 25 and/or tape 12 may be moved away from the heads 30 of a particular head assembly 20a, 20b as the first and second stabilizer arrangements 26a and 26b are moved away from the first and second head assemblies 20a and 20b, respectively. By pulling the leaders 24 and 25 and corresponding connection location 38 away from the heads 30, wear and debris may be minimized and the possibility of damage to the heads 30 may be greatly reduced.

In the illustrated embodiment, the first and second engagement members 58a and 58b are attached to first and second L-shaped supports 62a and 62b, respectively, which are each mounted on a particular stabilizer mount 36. With such a configuration, a desired position of the connection location 38 with respect to the heads 30 and the stabilizers 34 can be maintained when the stabilizer arrangements 26a and 26b are in the retracted positions. Furthermore, with respect to a particular stabilizer arrangement 26a or 26b, the corresponding engagement member 58a or 58b and tape stabilizers 34 are positioned on opposite sides of the drive leader 24 when the drive leader 24 is disposed between the corresponding head assembly 20a or 20b and the tape stabilizers 34.

After desired portions of the drive leader 24 and/or cartridge leader 25 (e.g., the connection location 38) have been moved past the head assemblies 20a and 20b, the retraction mechanism 28 may be operated to move the stabilizer arrangements 26a and 26b back to the operational positions, shown in FIGS. 1 and 3, so that the head assemblies 20a and 20b may be used to perform read and/or write operations on the tape 12. For example, the motor 44 may be operated to rotate the lead screw 46 in a second direction, opposite the first direction, so that the drive member 48 and link 40 translate or otherwise move away from the motor 44, so that the link 40 will cause the stabilizer arrangements 26a and 26b to pivot or otherwise move with respect to the drive body 18 to the operational positions.

While certain embodiments of a data storage and retrieval system and method utilizing a tape media and a rotary head have been illustrated and described herein, they are exemplary only and it is not intended that these embodiments illustrate and describe all those possible. Rather, the words used herein are words of description rather than limitation, and it is understood that various changes may be made without departing from the spirit and scope of the following claims.

What is claimed is:

1. A tape drive for use with a tape, the tape drive comprising:
   a head for performing read and/or write operations on the tape;
   a drive leader that is cooperable with the tape for moving the tape along a tape path of the tape drive; and
   a retraction mechanism for retracting the tape, the drive leader and/or a cartridge leader attached to the tape away from the head to allow at least a portion of the drive leader to pass by the head without contacting the head, the retraction mechanism including a movable pin that is engageable with the tape, the cartridge leader and/or the drive leader, the pin being movable from a first position proximate the head to a second position disposed further away from the head than the first position.

2. The tape drive of claim 1 wherein the retraction mechanism further comprises a tape stabilizer arrangement including a tape stabilizer for facilitating movement of the tape by the head, and wherein the pin is supported by the tape stabilizer arrangement.

3. The tape drive of claim 2 wherein the pin and the tape stabilizer are positionable on opposite sides of the drive leader when the drive leader is disposed between the head and the tape stabilizer.

4. The tape drive of claim 2 wherein the retraction mechanism further comprises a link associated with the tape stabilizer arrangement, and a motor for moving the link so as to move the tape stabilizer arrangement.

5. The tape drive of claim 4 further comprising a lead screw disposed between the link and the motor, and wherein the motor is operable to rotate the lead screw to thereby move the link.

6. The tape drive of claim 5 wherein the link includes a slot that slidably receives the tape stabilizer arrangement.

7. A tape drive for use with a tape, the tape drive comprising:
   first and second heads for performing read and/or write operations on the tape;
   a drive leader that is cooperable with the tape for moving the tape along a tape path of the drive;
   first and second tape stabilizers for facilitating movement of the tape by the first and second heads, respectively; and
   a retraction mechanism for simultaneously moving the first and second tape stabilizers in different directions and away from the first and second heads, respectively, to allow at least a portion of the drive leader to pass between the tape stabilizers and the heads without contacting the heads.

8. The tape drive of claim 7 wherein the retraction mechanism comprises a link associated with the first and second tape stabilizers, and a motor for moving the link so as to move the tape stabilizers.

9. The tape drive of claim 8 wherein the link comprises a tiebar.

10. The tape drive of claim 8 further comprising a drive body for supporting the first and second heads, wherein the link is pivotable and translatable with respect to the drive body.

11. The tape drive of claim 8 further comprising a lead screw disposed between the link and the motor, and wherein the motor is operable to rotate the lead screw to thereby move the link.

12. The tape drive of claim 8 wherein the retraction mechanism further comprises first and second movable stabilizer mounts that respectively support the first and second tape stabilizers, and wherein the link is connected to the stabilizer mounts.

13. The tape drive of claim 12 wherein the link includes first and second slots that slidably receive the first and second stabilizer mounts, respectively.

14. The tape drive of claim 12 further comprising a drive body for supporting the first and second heads, wherein the drive body includes first and second guide slots that are engageable with the first and second stabilizer mounts, respectively, for guiding movement of the stabilizer mounts.

15. The tape drive of claim 14 wherein the drive body further includes third and fourth guide slots that are engageable with the first and second stabilizer mounts, respectively, for guiding movement of the stabilizer mounts, and wherein the third and fourth guide slots are spaced away from the first and second guide slots, respectively.

16. The tape drive of claim 12 wherein the retraction mechanism further comprises first and second engagement members that are supported by and movable with the first and second stabilizer mounts, respectively, and wherein the engagement members are engageable with the tape, the drive leader and/or a cartridge leader attached to the tape for moving the tape, the drive leader and/or the cartridge leader away from the heads when the first and second tape stabilizers are moved away from the first and second heads, respectively, to allow at least a portion of the drive leader to pass by the heads without contacting the heads.

17. The tape drive of claim 16 wherein the engagement members are formed as pins.

18. The tape drive of claim 16 wherein the first engagement member and the first tape stabilizer are positionable on opposite sides of the drive leader when the drive leader is disposed between the first head and the first tape stabilizer.

19. A method for allowing passage of a connection location of a tape leader through a tape path, the method comprising:
simultaneously moving first and second tape stabilizers in different directions and away from first and second heads, respectively, to create sufficient gaps between the stabilizers and the heads such that the connection location of the tape leader may move past the heads without contacting the heads.

20. The method of claim 19 wherein the tape leader is attachable to a cartridge leader at the connection location, and the method further comprises engaging the tape leader and/or the cartridge leader with an engagement member, and moving the engagement member away from one of the heads to thereby move at least a portion of the tape leader away from the one head.

* * * * *